(12) United States Patent
Saito et al.

(10) Patent No.: US 9,517,513 B2
(45) Date of Patent: Dec. 13, 2016

(54) DRILL DRIVING APPARATUS AND DRILL DRIVING METHOD

(71) Applicant: Fuji Jukogyo Kabushiki Kaisha, Tokyo (JP)

(72) Inventors: Manabu Saito, Tokyo (JP); Tatsuo Nakahata, Tokyo (JP); Masao Watanabe, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 132 days.

(21) Appl. No.: 13/932,578

(22) Filed: Jul. 1, 2013

(65) Prior Publication Data

US 2014/0003875 A1   Jan. 2, 2014

(30) Foreign Application Priority Data

Jul. 2, 2012   (JP) ................... 2012-148183

(51) Int. Cl.
*B23B 47/28*   (2006.01)
*B23B 49/02*   (2006.01)
*B23B 49/00*   (2006.01)

(52) U.S. Cl.
CPC ............. *B23B 47/28* (2013.01); *B23B 47/287* (2013.01); *B23B 49/008* (2013.01); *B23B 49/023* (2013.01); *B23B 2215/04* (2013.01); *B23B 2247/12* (2013.01); *Y10T 408/03* (2015.01);
(Continued)

(58) Field of Classification Search
CPC ............. B23B 2215/04; B23B 2247/12; B23B 47/287; B23B 49/02; B23B 49/032; B23B 49/008; Y10T 408/557; Y10T 408/558; Y10T 408/5623; Y10T 408/56245
See application file for complete search history.

(56) References Cited

U.S. PATENT DOCUMENTS 1,657,914 A * 1/1928 Chadwick ............ 384/41
2,360,942 A   10/1944 Ellerstein
2,426,124 A   8/1947 Skwierawski
(Continued)

FOREIGN PATENT DOCUMENTS

DE   4431952 A1 * 3/1996 ............ B23B 47/28
EP   0 255 120 A1   2/1988
(Continued)

OTHER PUBLICATIONS

Extended European Search Report issued Nov. 7, 2013, in related patent Application No. 13 17 3472.5.
(Continued)

*Primary Examiner* — Eric A Gates
*Assistant Examiner* — Donte Brown
(74) *Attorney, Agent, or Firm* — Smith, Gambrell & Russell, LLP

(57) ABSTRACT

A drill driving apparatus includes a tool driving mechanism and a driving mechanism fixing instrument. The tool driving mechanism is configured to hold a tool and apply a rotation operation and a feeding operation in a tool axis direction to the tool. The driving mechanism fixing instrument has a through hole through which the tool passes. The driving mechanism fixing instrument is configured to be inserted detachably into a guiding through hole in order to fix the tool driving mechanism to a drill jig in which the guiding through hole is formed.

14 Claims, 4 Drawing Sheets

(52) U.S. Cl.
CPC ......... *Y10T 408/558* (2015.01); *Y10T 408/567* (2015.01); *Y10T 408/56245* (2015.01)

(56) References Cited

U.S. PATENT DOCUMENTS

| | | | | |
|---|---|---|---|---|
| 2,454,372 | A | | 11/1948 | Billeter |
| 2,839,953 | A | * | 6/1958 | Hanger ................ 408/72 R |
| 2,935,905 | A | * | 5/1960 | Winslow ................ 408/112 |
| 3,024,673 | A | * | 3/1962 | Schneider et al. ............ 408/112 |
| 3,663,115 | A | * | 5/1972 | Vindez et al. ................ 408/79 |
| 4,643,621 | A | * | 2/1987 | Fuller et al. ................ 408/57 |
| 4,740,117 | A | * | 4/1988 | Schaff Deleury et al. . 408/72 R |
| 5,088,171 | A | * | 2/1992 | Suzuki ................ 29/26 A |
| 5,161,923 | A | * | 11/1992 | Reccius ................ 408/72 R |
| 5,395,187 | A | | 3/1995 | Slesinski et al. |
| 5,482,411 | A | * | 1/1996 | McGlasson ................ 408/1 R |
| 5,628,592 | A | * | 5/1997 | Ringer ................ 408/97 |
| RE38,684 | E | * | 1/2005 | Cesarone ................ 606/915 |
| 7,220,084 | B2 | * | 5/2007 | Otten ................ 408/1 R |
| 7,611,314 | B2 | * | 11/2009 | Lipczynski et al. ......... 409/200 |
| 8,448,929 | B2 | * | 5/2013 | Prot et al. ................ 269/49 |
| 2004/0101376 | A1 | * | 5/2004 | Shemeta ................ 408/130 |
| 2010/0054876 | A1 | * | 3/2010 | Shemeta ................ 408/16 |

FOREIGN PATENT DOCUMENTS

| | | | | |
|---|---|---|---|---|
| GB | 829388 | A | * | 3/1960 ............ B23B 47/28 |
| GB | 829388 | A | | 3/1960 |
| JP | 62-094208 | A | | 4/1987 |
| JP | 1-114212 | U1 | | 8/1989 |
| JP | 2010-228049 | A | | 10/2010 |
| JP | 2011-131332 | A | | 7/2011 |

OTHER PUBLICATIONS

Japanese Final Office Action mailed May 17, 2016 relative to JP2012-148183 (with English Translation) 7 pages.
Japanese Office Action mailed Feb. 23, 2016 relative to JP2012-148183 (with English Translation) 6 pages.

\* cited by examiner

DRILL DRIVING APPARATUS AND DRILL DRIVING METHOD

CROSS-REFERENCE TO RELATED APPLICATIONS

The present application claims priority from Japanese Patent Application No. 2012-148183, filed on Jul. 2, 2012, the entire contents of which are hereby incorporated by reference.

BACKGROUND OF THE INVENTION

1. Field of the Invention

An embodiment of the present invention relates to a drill driving apparatus and a drill driving method.

2. Description of the Related Art

A handheld drill driving apparatus is known as a conventional hand tool for driving a drill. A handheld drill driving apparatus may include a mechanism that applies a feeding operation to the drill in an axial direction thereof (see Japanese Unexamined Patent Application Publication (JP-A) No. 2010-228049, for example). During drilling using a handheld drill driving apparatus, it is important to set a tool perpendicular to a work piece. Conventionally, therefore, a setscrew is used to fix the drill driving apparatus to a drill jig provided with a guiding through hole.

To fix the drill driving apparatus to the drill jig, however, an operation must be performed to tighten the setscrew. Moreover, a female screw for fixing the drill driving apparatus must be provided in the drill jig in addition to the guiding through hole. It is therefore difficult to provide a plurality of guiding through holes in a common drill jig at a narrow pitch. As a result, when a plurality of holes are drilled at a narrow pitch, operations to attach and detach the drill jig to and from the drill driving apparatus must be performed a plurality of times.

SUMMARY OF THE INVENTION

The present invention has been designed in consideration of the circumstances described above, and an object thereof is to provide a drill driving apparatus and a drill driving method with which drilling can be performed easily at an appropriate orientation.

An aspect of the present invention provides a drill driving apparatus that includes a tool driving mechanism and a driving mechanism fixing instrument. The tool driving mechanism is configured to hold a tool and apply a rotation operation and a feeding operation in a tool axis direction to the tool. The driving mechanism fixing instrument has a through hole through which the tool passes. The driving mechanism fixing instrument is configured to be inserted detachably into a guiding through hole in order to fix the tool driving mechanism to a drill jig in which the guiding through hole is formed.

Another aspect of the present invention provides a drill driving method that includes: fixing a tool driving mechanism to a drill jig by inserting a driving mechanism fixing instrument, having a through hole through which a tool is passed, into a guiding through hole formed in the drill jig; and applying a rotation operation and a feeding operation in a tool axis direction to the tool in a condition where the tool has been held by the tool driving mechanism.

DESCRIPTION OF THE PREFERRED EMBODIMENTS

A drill driving apparatus and a drill driving method according to an embodiment of the present invention will be described below with reference to the attached drawings.

(Configuration and Functions)

Figure 1:
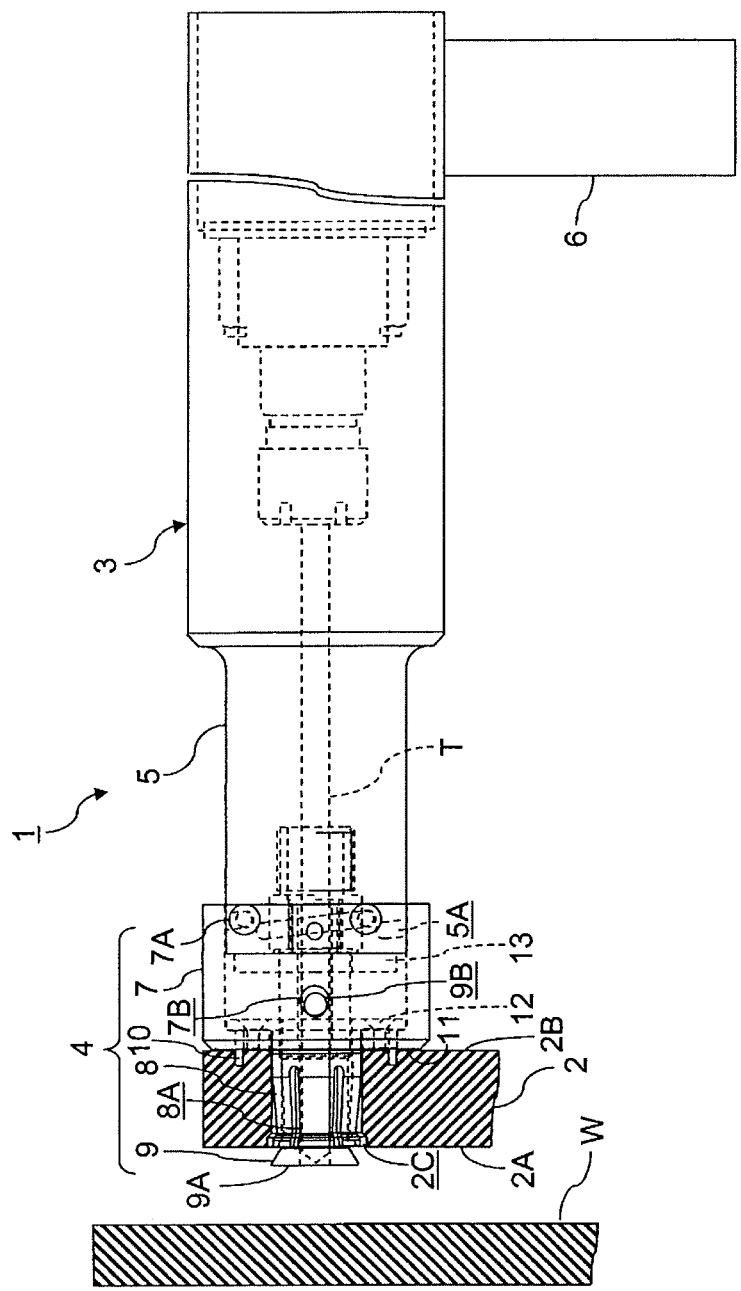
FIG. 1 is a view showing a configuration of a drill driving apparatus according to an embodiment of the present invention.

FIG. 1 is a view showing a configuration of the drill driving apparatus according to this embodiment of the present invention.

A drill driving apparatus 1 is a handheld hand tool that drills a work piece W serving as a processing subject using a drill jig 2. For this purpose, the drill driving apparatus 1 includes a tool driving mechanism 3 provided with a driving mechanism fixing instrument 4.

The drill jig 2 is provided with a work piece side contact surface 2A that is pressed against the work piece W, and a tool side contact surface 2B and a guiding through hole 2C that are pressed against the drill driving apparatus 1 in a tool axis direction. A depth direction of the guiding through hole 2C corresponds to the tool axis direction, which is perpendicular to the tool side contact surface 2B. Hence, the drill jig 2 is structured such that when a surface of the work piece W is planar, the through hole 2C is provided in a thickness direction of a plate-shaped member constituting the drill jig 2. In many cases, the guiding through hole 2C is provided in the drill jig 2 in a plurality.

When a tool T is passed through the guiding through hole 2C, the drill driving apparatus 1 contacts the tool side contact surface 2B of the drill jig 2, while the work piece side contact surface 2A of the drill jig 2 contacts the work piece W. As a result, a tool axis can be oriented in an axial direction of a hole to be drilled.

The tool driving mechanism 3 is a constituent element of the drill driving apparatus 1 for holding the tool T, such as a drill, an end mill, or a reamer, and applying a rotation operation and an operation for feeding the tool T in the tool axis direction to the tool T. The tool driving mechanism 3 may be formed with any desired conventional structure. As a representative example, a mechanism for rotating the tool T and a mechanism for moving the tool T in a feed direction may be constituted by a pneumatic motor and a pneumatic cylinder driven by air. Note, however, that the tool driving mechanism 3 may also be constructed using other desired constituent elements such as an electric motor, a hydraulic cylinder, and so on.

A casing that protects the rotation mechanism and moving mechanism of the drill driving mechanism 3 and forms an outline of the tool driving mechanism 3 is known as a nose piece 5. The tool driving mechanism 3 is also provided with a grip 6 that is gripped by a user.

The driving mechanism fixing instrument 4 is a member for fixing the tool driving mechanism 3 to the drill jig 2. More specifically, the tool driving mechanism 3 can be fixed to the drill jig 2 by connecting the driving mechanism fixing instrument 4 to the tool driving mechanism 3 and inserting the driving mechanism fixing instrument 4 detachably into the guiding through hole 2C provided in the drill jig 2. For this purpose, a through hole through which the tool T passes is provided in the driving mechanism fixing instrument 4.

The driving mechanism fixing instrument 4 is preferably structured to be fixed to the drill jig 2 when the tool driving mechanism 3 is rotated relative to the drill jig 2 in an opposite direction to a rotation direction of the tool T. In other words, by structuring the driving mechanism fixing instrument 4 to be fixed to the drill jig 2 more firmly when the tool driving mechanism 3 is rotated in a counter-clockwise direction opposite to a clockwise direction serving as the rotation direction of the tool T, loosening of the driving mechanism fixing instrument 4 as the tool T rotates can be prevented.

As regards a method of fixing the driving mechanism fixing instrument 4 to the drill jig 2, the tool driving mechanism 3 can be fixed more stably when the driving mechanism fixing instrument 4 is structured to sandwich the drill jig 2. FIG. 1 shows an example of the driving mechanism fixing instrument 4 having this structure.

Figure 2:
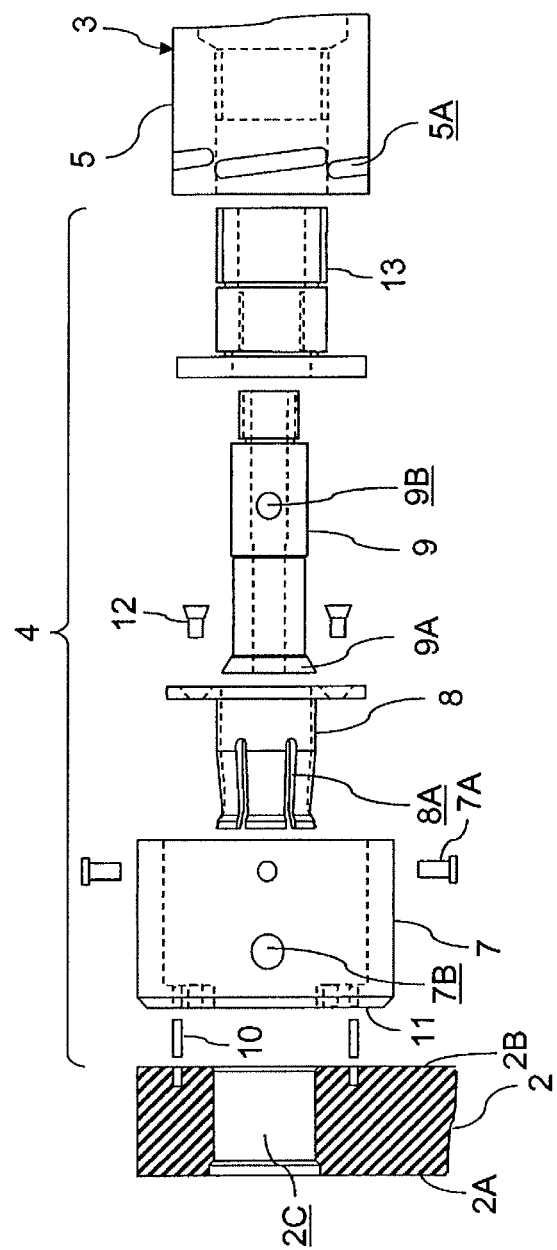
FIG. 2 is an exploded view of a driving mechanism fixing instrument shown in FIG. 1.

FIG. 2 is an exploded view of the driving mechanism fixing instrument 4 shown in FIG. 1.

As shown in FIG. 1 and FIG. 2, the driving mechanism fixing instrument 4 may be constituted by a first guide 7, a second guide 8, and a third guide 9.

The first guide 7 has a surface that contacts the tool side contact surface 2B of the drill jig 2. Further, the first guide 7 is connected to the drill driving mechanism 3. The first guide 7 is configured such that when the tool driving mechanism 3 is rotated relatively in the opposite direction to the rotation direction of the tool T, the surface that contacts the drill jig 2 moves away from the tool driving mechanism 3.

In the illustrated example, the first guide 7 is connected to an outer surface of a tool T side end portion of the nose piece 5 forming the tool driving mechanism 3. Accordingly, the first guide 7 has a cylindrical shape that is open on the tool driving mechanism 3 side. A tip end of the nose piece 5 is inserted into the open end of the first guide 7.

The first guide 7 and the tool driving mechanism 3 can be connected by grooves 5A having an inclined length direction relative to the tool axis direction and projections that move along the grooves 5A. In the illustrated example, three grooves 5A inclining relative to the tool axis direction are provided around an outer periphery of the tip end of the nose piece 5. The first guide 7, meanwhile, is provided with a female screw that penetrates inwardly from an exterior thereof. When a male screw 7A is screwed to the female screw in the first guide 7 from the exterior side, a tip end of the male screw 7A projects into the interior of the first guide 7. The tip end of the male screw 7A thus serves as the projection that enters the grooves 5A in the nose piece 5.

Hence, when the nose piece 5 or the first guide 7 is rotated counter-clockwise, the tip end of the male screw 7A functioning as the projection moves to a shank side of the tool T through the inclining grooves 5A of the nose piece 5. As a result, the first guide 7 moves in a separating direction relative to the tool driving mechanism 3 while remaining equidistant to the drill jig 2. Conversely, when the nose piece 5 or the first guide 7 is rotated clockwise, the tip end of the male screw 7A functioning as the projection moves to a tip end side of the tool T through the inclining grooves 5A of the nose piece 5. As a result, the first guide 7 moves in an approaching direction relative to the tool driving mechanism 3 while remaining equidistant to the drill jig 2. Hence, by rotating the first guide 7, the tool T can be moved relative to the drill jig 2 in the tool axis direction.

Note that another structure may be employed to connect the first guide 7 and the tool driving mechanism 3. For example, the projection may be provided on the nose piece 5 side and the inclining grooves may be provided in an inner surface of the first guide 7. However, when the male screw 7A is screwed from the exterior of the first guide 7, as shown in FIG. 1, the first guide 7 can be attached to and detached from the nose piece 5 easily.

Further, penetrating slits may be provided in place of the grooves 5A. By providing the closed groove 5A as a guide for the projection, however, the inside of the nose piece 5 can be sealed tightly. As a result, an air suction hose of a dust collecting apparatus can be connected to the nose piece 5 to perform dust collection.

Alternatively, a screw may be employed in a different structure where a rotary movement of the first guide 7 or the nose piece 5 is switched to a linear movement of the first guide 7. More specifically, a male screw may be provided on an outer surface of the nose piece 5, and a female screw that can be screwed to the male screw of the nose piece 5 may be provided in the inner surface of the first guide 7. With the structure shown in FIG. 1, however, in which the first guide 7 and the tool fixing mechanism 3 are connected using the grooves 5A and the projection, a problem of chips entering a connecting portion can be mitigated in comparison with a case in which a screw is employed.

A surface of the first guide 7 on an opposite side to the tool fixing mechanism 3 contacts the tool side contact surface 2B of the drill jig 2. It is therefore desirable to prevent the first guide 7 from rotating relative to the drill jig 2. Hence, a whirl-stop pin 10 for preventing the first guide 7 from rotating relative to the drill jig 2 may be provided between the first guide 7 and the drill jig 2.

Moreover, in addition to or instead of the whirl-stop pin 10, an antiskid member 11 may be provided on the surface of the first guide 7 that contacts the drill jig 2. In other words, at least one of the whirl-stop pin 10 and the antiskid member 11 may be provided on the first guide 7. As a method of providing the antiskid member 11, the surface of the first guide 7 may be intentionally roughened, provided with irregularities, knurled, and so on.

By increasing a frictional coefficient on a mating surface between the first guide 7 and the drill jig 2 in this manner, rotation between the first guide 7 and the drill jig 2 can be suppressed even when a radial direction drilling reaction force is large. As a result, drilling can be performed favorably even during heavy-duty cutting for forming a hole having a large diameter.

A through hole having a diameter that is at least as large as that of the guiding through hole 2C is provided in the drill jig 2 side of the first guide 7. The second guide 8, which is inserted into the guiding through hole 2C of the drill jig 2 from the interior of the first guide 7 via the through hole in the first guide 7, is provided as a component of the driving mechanism fixing instrument 4. Hence, by aligning the respective diameters of the through hole in the first guide 7 and the guiding through hole 2C provided in the drill jig 2, a step is not required on an outer peripheral surface of the second guide 8.

Figure 3:
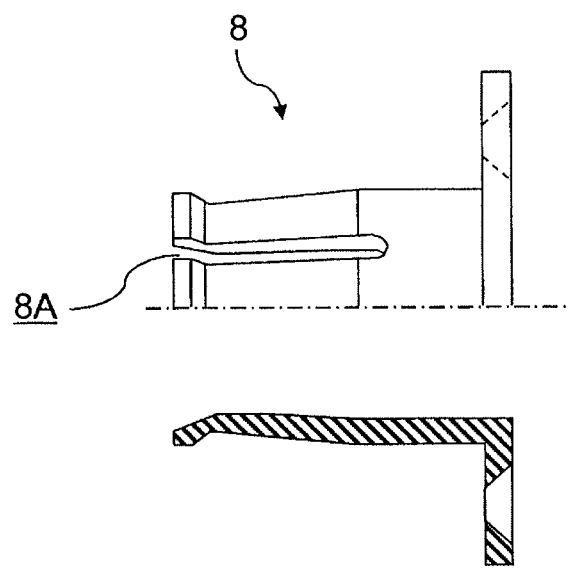
FIG. 3 is a partial sectional view showing in detail a structure of a second guide shown in FIG. 1.

FIG. 3 is a partial sectional view showing in detail a structure of the second guide 8 shown in FIG. 1.

A surface that contacts the inner surface of the first guide 7 fixedly is provided on the tool driving mechanism 3 side of the second guide 8. In the illustrated example, a disc-shaped part that contacts the inner surface of the first guide 7 is provided on the tool driving mechanism 3 side of the second guide 8. The disc-shaped part of the second guide 8 and a side face of the first guide 7 are fixed by desired fixing means. In the illustrated example, the first guide 7 and the second guide 8 are integrated using a plurality of countersunk screws 12.

The work piece W side of the second guide 8, meanwhile, has a smaller outer shape than the guiding through hole 2C of the drill jig 2 so that this side can be inserted into the guiding through hole 2C. The second guide 8 is formed to widen in the interior of the guiding through hole 2C in a radial direction of the guiding through hole 2C when the tool driving mechanism 3 is rotated relative to the first guide 7 in the opposite direction to the rotation direction of the tool T.

To obtain this function, in the illustrated example, a plurality of slits 8A having the tool axis direction as a length direction are provided in a work piece W side end portion of the second guide 8. Further, the second guide 8 is formed from a material possessing flexibility or elasticity, such as plastic, so that the outer shape of the second guide 8 on the work piece W side can be varied.

Note that the guiding through hole 2C in the drill jig 2 may be chamfered or formed in alignment with the shape of the second guide 8 so as to correspond to deformation of the end portion of the second guide 8. In the illustrated example, a clearance matching the shape of the second guide 8 is provided in the guiding through hole 2C so that when the outer shape of the second guide 8 widens, the second guide 8 fits into the guiding through hole 2C.

The second guide 8 is provided with a tool axis direction through hole through which the third guide 9 is passed. The third guide 9 is a component of the driving mechanism fixing instrument 4 for widening the second guide 8 in the radial direction of the guiding through hole 2C when the surface of the first guide 7 that contacts the drill jig 2 is separated from the tool driving mechanism 3. In other words, the third guide 9 serves to convert rotary torque into a force for widening the second guide 8 when the tool driving mechanism 3 is rotated relative to the first guide 7.

A tool driving mechanism 3 side of the third guide 9 is fixed to the tool driving mechanism 3. In the illustrated example, the third guide 9 is fixed to the tool driving mechanism 3 via an adapter 13. More specifically, a female screw is provided in the nose piece 5 of the tool driving mechanism 3 in the tool axis direction.

Meanwhile, a male screw is provided on a nose piece 5 side outer surface of the adapter 13, and a plate-shaped portion for screwing the adapter 13 to the nose piece 5 using a tool such as a spanner is provided on the third guide 9 side. A flat part may be provided on a side face of the plate-shaped portion of the adapter 13 in accordance with a size of the tool. Further, a female screw is provided in an interior of the third guide 9 side of the adapter 13.

Furthermore, a male screw is provided on the adapter 13 side of the third guide 9. The third guide 9, the adapter 13, and the nose piece 5 can be connected by screwing together the male screws and female screws provided on the third guide 9, the adapter 13, and the nose piece 5.

Note that by forming the male screws and female screws for connecting the third guide 9, the adapter 13, and the nose piece 5 from left-hand screws, the third guide 9 can be fixed to the tool driving mechanism 3 more firmly when fixing the tool driving mechanism 3 to the drill jig 2. In other words, the third guide 9 can be fixed more firmly when the tool driving mechanism 3 is rotated counter-clockwise.

Furthermore, it is important to make torque for screwing the adapter 13 to the nose piece 5 larger than torque for screwing the third guide 9 to the adapter 13. By attaching the third guide 9 to the nose piece 5 indirectly via the adapter 13 rather than directly, damage and wear to the female screw provided in the nose piece 5 can be avoided.

The third guide 9 is provided with a through hole through which the tool T is passed. Hence, the tool T contacts the work piece W via the through hole in the third guide 9, which is inserted into the through hole in the second guide 8, which itself is inserted into the guiding through hole 2C provided in the drill jig 2.

A tapered portion 9A for widening the work piece W side of the second guide 8 is provided on a work piece W side end portion of the third guide 9. As shown in FIG. 1, to widen the work piece W side of the second guide 8, the tapered portion 9A is preferably formed from a reverse taper that becomes gradually thinner from a work piece W side end portion of the third guide 9 toward the second guide 8 side.

Further, holes 7B, 9B for inserting a rotary rod-shaped instrument are provided respectively in the first guide 7 and the third guide 9 so that the first guide 7 and the third guide 9 can be attached and detached when rotated relative to the tool driving mechanism 3.

(Operations and Actions)

Next, a method of drilling the work piece W using the drill driving apparatus 1 will be described.

As shown in FIG. 1, when the first guide 7 is rotated clockwise relative to the tool driving mechanism 3 in a condition where the first guide 7, the second guide 8, the third guide 9, and the tool T are attached to the tool driving mechanism 3, the projecting portion of the male screw 7A projecting into the interior of the first guide 7 moves along the grooves 5A. Accordingly, the tool driving mechanism 3 and the third guide 9 move to the tip end side of the tool T relative to the first guide 7.

As a result, the tapered portion 9A of the third guide 9 projects sufficiently from the second guide 8 so that an outer diameter of the second guide 8 is equal to or smaller than an inner diameter of the guiding through hole 2C provided in the drill jig 2. Hence, the second guide 8 can be inserted into the through hole 2C in the drill jig 2 with the third guide 9 inserted therein. At this time, the whirl-stop pin 10 may, if required, be provided between the first guide 7 and the drill jig 2.

Next, by rotating the first guide 7 counter-clockwise relative to the tool driving mechanism 3, the drill driving apparatus 1 can be fixed to the drill jig 2.

Figure 4:
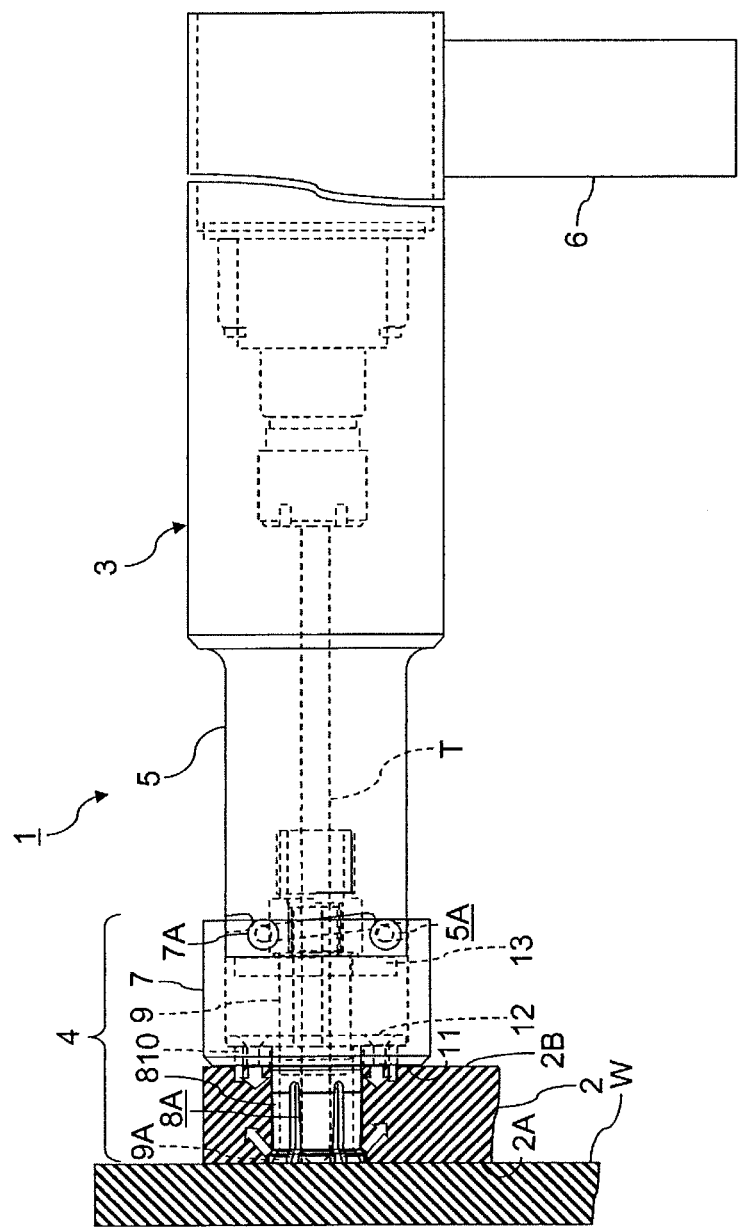
FIG. 4 is a view showing a condition in which the drill driving apparatus shown in FIG. 1 is fixed to a drill jig.

FIG. 4 is a view showing a condition in which the drill driving apparatus 1 shown in FIG. 1 is fixed to the drill jig 2.

When the first guide 7 is rotated counter-clockwise relative to the tool driving mechanism 3, the projecting portion of the male screw 7A projecting into the interior of the first guide 7 moves along the grooves 5A. Accordingly, the tool driving mechanism 3 and the third guide 9 move to the shank side of the tool T relative to the first guide 7. The second guide 8, meanwhile, is fixed to the first guide 7.

As a result, as shown in FIG. 4, the tapered portion 9A provided on the tip end of the third guide 9 is pressed against the second guide 8 so that the work piece W side end portion of the second guide 8 widens in an inner diameter direction of the guiding through hole 2C. Accordingly, the second guide 8 is pressed tightly against the through hole 2C in the drill jig 2. As a result, a force oriented in a normal direction of the tapered portion 9A of the third guide 9 acts on the drill jig 2 from the driving mechanism fixing instrument 4 including the second guide 8 and the third guide 9.

Hence, the second guide 8 and the third guide 9 support each other by the respective surfaces thereof. As a result, bending is not exerted on the tip end of the second guide 8, and therefore a durability of the second guide 8 can be improved. For example, the end portion of the second guide 8 can be pressed against the drill jig 2 even when formed with an L-shaped longitudinal section. Note, however, that in this case, a shearing force and bending are generated in a plate thickness direction of the second guide 8. By providing the tapered portion 9A on the end portion of the third guide 9, on the other hand, the bending exerted on the second guide 8 can be reduced, and therefore damage to the second guide 8 can be suppressed.

Meanwhile, the first guide 7 is pressed against the drill jig 2 side. Accordingly, a force acts on the drill jig 2 in a perpendicular direction from the first guide 7. As a result, the drill jig 2 is sandwiched by the driving mechanism fixing instrument 4. In other words, the entire drill driving apparatus 1, including the tool driving mechanism 3, is fixed to the drill jig 2.

By attaching the drill jig 2 to the work piece W, the work piece W can be drilled. During drilling, the tool driving mechanism 3 applies a rotation operation and a feeding operation to the tool T. As a result, a drilling reaction force is exerted on the drill driving apparatus 1 in a radial direction and a thrust direction. The radial direction drilling reaction force can be received by a frictional force and the whirl-stop pin 10 between the first guide 7 and the drill jig 2. The thrust direction drilling reaction force, meanwhile, can be received by the tapered portion 9A of the third guide 9.

When drilling is complete, the drill jig 2 is detached from the work piece W. The first guide 7 is then rotated clockwise relative to the tool driving mechanism 3. As a result, the third guide 9 projects from the second guide 8 again such that the second guide 8, having decreased in diameter to or below the inner diameter of the through hole 2C provided in the drill jig 2, can be withdrawn from the drill jig 2. In other words, the drill driving apparatus 1 can be detached from the drill jig 2.

Hence, in the drill driving apparatus 1 described above, the tool driving mechanism 3 is fixed to the drill jig 2 by inserting the driving mechanism fixing instrument 4 having the through hole through which the tool T is passed into the guiding through hole 2C provided in the drill jig 2, and with the tool T held by the tool driving mechanism 3, a rotation operation and an operation for feeding the tool T in the tool axis direction are applied to the tool T. To put it more simply, the drill driving apparatus 1 can be fixed to the drill jig 2 using the guiding through hole 2C provided in the drill jig 2.

(Effects)

According to the drill driving apparatus 1, therefore, the tool driving mechanism 3 can be fixed to the drill jig 2 without performing a fastening operation using a setscrew. Moreover, a setscrew need not be provided in relation to the drill jig 2. Hence, a plurality of guiding through holes 2C can be provided in the drill jig 2 at a narrow pitch. As a result, drilling can be performed at a narrow pitch by setting the drill jig 2 a single time.

Further, since a setscrew is not used, a position in which the tool driving mechanism 3 is attached to the drill jig 2 in the rotation direction of the tool T can be set freely. In other words, the tool driving mechanism 3 can be fixed to the drill jig 2 by setting an angle of the tool driving mechanism 3 in the rotation direction of the tool T as desired. Therefore, a user does not need to check the angle of the tool driving mechanism 3, and as a result, the tool driving mechanism 3 can be fixed to the drill jig 2 easily.

Furthermore, in the drill driving apparatus 1, by making the first guide 7, the second guide 8, and the third guide 9 separable, the second guide 8, which is formed from a material such as plastic and is therefore more likely to deteriorate and deform, can be replaced easily.

A specific embodiment was described above, but the described embodiment is merely an example, and does not limit the scope of the present invention. The novel method and apparatus described herein may be realized in various other forms. Further, various omissions, replacements, and modifications may be applied to the forms of the method and apparatus described herein within a scope that does not depart from the spirit of the present invention. The attached claims and equivalent matter thereto are assumed to be incorporated into the scope and spirit of the present invention, and therefore include these various forms and modifications.

What is claimed is:

1. A drill driving apparatus comprising: a tool driving mechanism configured to hold a tool and apply a rotation operation and a feeding operation in a tool axis direction to the tool; and a driving mechanism fixing instrument, having a through hole through which the tool passes, configured to be inserted detachably into a guiding through hole from only a tool side in order to fix the tool driving mechanism to a drill jig in which the guiding through hole is formed, wherein the driving mechanism fixing instrument has a guide that has a smaller outer shape than the guiding through hole in order to be able to be inserted into the guiding through hole, the guide widening in an interior of the guiding through hole in a radial direction of the guiding through hole when the tool driving mechanism is rotated relative to the drill jig in an opposite direction to a rotation direction of the tool, wherein the driving mechanism fixing instrument is configured to sandwich the drill jig by pressing the guide against a chamfer formed in a workpiece side of the guiding through hole, the chamfer being formed to fit with the guide when the outer shape of the guide widens, wherein the driving mechanism fixing instrument is fixed to the drill jig when the tool driving mechanism is rotated relative to the drill jig in the opposite direction to the rotation direction of the tool, and wherein the driving mechanism fixing instrument comprises: a first guide having a surface that contacts the drill jig, wherein the surface moves away from the tool driving mechanism when the tool driving mechanism is rotated relatively in the opposite direction to the rotation direction of the tool; a second guide comprising the guide that widens in an interior of the guiding through hole in a radial direction of the guiding through hole when the tool driving mechanism is rotated relative to the first guide in the opposite direction to the rotation direction of the tool; and a third guide comprising a tapered portion, the tapered portion being fixed to the tool driving mechanism and widens the guide that widens in the radial direction of the guiding through hole when the surface of the first guide that contacts the drill jig moves away from the tool driving mechanism.

2. A drill driving method comprising:
utilizing the drill driving apparatus of claim 1; and
applying a rotation operation and a feeding operation in a tool axis direction to the tool in a condition where the tool is held by the tool driving mechanism.

3. The drill driving method according to claim 2, wherein the guide that widens in an interior of the guiding through hole in the radial direction also compresses in the interior of the guiding through hole in the radial direction.

4. The drill driving apparatus according to claim 1, wherein the guide that widens in an interior of the guiding through hole in the radial direction is formed to also compress in the interior of the guiding through hole in the radial direction.

5. The drill driving apparatus according to claim 4, wherein the guide that widens and compresses in an interior of the guiding through hole in the radial direction has an axially extending slit.

6. According to claim 4, wherein the guide that widens and compresses in an interior of the guiding through hole in the radial direction has a deformable free end configured for reception within a chamfered recess formed in one of opposing surfaces of the drill jig that is oriented for positioning closest to a workpiece to be worked.

7. A drill driving apparatus comprising: a tool driving mechanism configured to hold a tool and apply a rotation operation and a feeding operation in a tool axis direction to the tool; and a driving mechanism fixing instrument having a through hole through which the tool passes, the driving mechanism fixing instrument being configured to be inserted detachably into a guiding through hole in a drill jig in order to fix the tool driving mechanism to the drill jig, wherein the driving mechanism fixing instrument comprises: a first guide having a surface that contacts the drill jig, wherein the surface moves away from the tool driving mechanism when the tool driving mechanism is rotated relatively in an opposite direction to a rotation direction of the tool; a second guide that widens in an interior of the guiding through hole in a radial direction of the guiding through hole when the tool driving mechanism is rotated relative to the first guide in the opposite direction to the rotation direction of the tool; and a third guide that is fixed to the tool driving mechanism and widens the second guide in the radial direction of the guiding through hole when the surface of the first guide that contacts the drill jig moves away from the tool driving mechanism, and wherein the driving mechanism fixing instrument is configured to fix the tool driving mechanism to the drill jig by sandwiching opposing surfaces of the drill jig, between which opposing surfaces the guiding through hole extends.

8. The drill driving apparatus according to claim 7, wherein the first guide is connected to the tool driving mechanism by a groove having a length direction that inclines relative to the tool axis direction and a projection that moves along the groove.

9. The drill driving apparatus according to claim 7, wherein the driving mechanism fixing instrument exerts a force on the drill jig in a normal direction of a tapered portion.

10. The drill driving apparatus according to claim 7, wherein the first guide is provided with at least one of either a whirl-stop pin and an antiskid member for suppressing rotation of the first guide relative to the drill jig.

11. A drill driving apparatus comprising:
a tool driving mechanism configured to hold a tool and apply a rotation operation and a feeding operation in a tool axis direction to the tool; and
a driving mechanism fixing instrument having a through hole through which the tool passes, the driving mechanism fixing instrument being configured to be inserted detachably into a guiding through hole in a drill jig in order to fix the tool driving mechanism to the drill jig,
wherein the driving mechanism fixing instrument comprises:
a first guide having a surface that contacts the drill jig, wherein the surface moves away from the tool driving mechanism when the tool driving mechanism is rotated relatively in an opposite direction to a rotation direction of the tool;
a second guide that widens in an interior of the guiding through hole in a radial direction of the guiding through hole when the tool driving mechanism is rotated relative to the first guide in the opposite direction to the rotation direction of the tool; and
a third guide that is fixed to the tool driving mechanism and widens the second guide in the radial direction of the guiding through hole when the surface of the first guide that contacts the drill jig moves away from the tool driving mechanism.

12. The drill driving apparatus according to claim 11, wherein the first guide is connected to the tool driving mechanism by a groove having a length direction that inclines relative to the tool axis direction and a projection that moves along the groove.

13. The drill driving apparatus according to claim 11, wherein
the third guide is provided with a tapered portion for widening the second guide, and
the driving mechanism fixing instrument exerts a force on the drill jig in a normal direction of the tapered portion.

14. The drill driving apparatus according to claim 11, wherein the first guide is provided with at least one of either a whirl-stop pin and an antiskid member for suppressing rotation of the first guide relative to the drill jig.

* * * * *